United States Patent [19]
Leatch

[11] Patent Number: 5,341,995
[45] Date of Patent: Aug. 30, 1994

[54] RELOCATABLE IRRIGATOR

[76] Inventor: Alfred T. Leatch, Peak Crossing to Warrill View Rd., Harrisville QLD 4307, Australia

[21] Appl. No.: 969,149
[22] PCT Filed: Aug. 9, 1991
[86] PCT No.: PCT/AU91/00355
§ 371 Date: Feb. 10, 1993
§ 102(e) Date: Feb. 10, 1993
[87] PCT Pub. No.: WO92/02124
PCT Pub. Date: Feb. 20, 1992

[30] Foreign Application Priority Data

Aug. 10, 1990 [AU] Australia .................... PK1691

[51] Int. Cl.$^5$ ................................. B05B 3/18
[52] U.S. Cl. .......................... 239/729; 239/731; 239/742
[58] Field of Search .............. 239/723, 726, 728, 729, 239/730, 731, 732, 733, 742

[56] References Cited

U.S. PATENT DOCUMENTS

| | | | |
|---|---|---|---|
| 3,394,729 | 7/1968 | Bower et al. | 239/731 |
| 3,583,639 | 6/1971 | Cornelius | 239/742 X |
| 3,608,826 | 9/1971 | Reinke | 239/729 |
| 3,623,662 | 11/1971 | Reinke | 239/731 |
| 3,628,729 | 12/1971 | Thomas | 239/731 X |
| 3,999,569 | 12/1976 | Lindner et al. | 239/742 X |
| 4,011,990 | 3/1977 | Meis et al. | 239/729 X |
| 4,034,778 | 7/1977 | Sage et al. | 239/731 |
| 4,085,771 | 4/1978 | Hunter | 239/731 |
| 4,132,244 | 1/1979 | Olson et al. | 239/742 X |
| 4,156,503 | 5/1979 | Noren | 239/728 X |
| 4,227,648 | 10/1980 | Holloway et al. | 239/11 |
| 4,266,732 | 5/1981 | Sage et al. | 239/731 |
| 4,277,023 | 7/1981 | Anderson et al. | 239/729 X |
| 4,305,549 | 12/1981 | Hewitt | 239/729 |
| 4,368,848 | 1/1983 | Emrich | 239/731 X |
| 4,371,116 | 2/1983 | Sage et al. | 239/731 |
| 4,411,386 | 10/1983 | Disbrow | 239/728 |
| 4,423,839 | 1/1984 | McConnell | 239/733 X |
| 4,434,936 | 3/1984 | Chapman et al. | 239/731 |
| 4,664,316 | 5/1987 | Purtell et al. | 239/735 |

FOREIGN PATENT DOCUMENTS

| | | |
|---|---|---|
| 3380757 | 6/1959 | Australia . |
| 4779259 | 10/1959 | Australia . |
| 57-67169 | 1/1971 | Australia . |
| 3135271 | 2/1972 | Australia . |
| 6150973 | 4/1975 | Australia . |
| 1640176 | 7/1976 | Australia . |
| 7907575 | 9/1976 | Australia . |
| 1870983 | 3/1985 | Australia . |
| 980661 | 12/1982 | U.S.S.R. . |

Primary Examiner—Andres Kashnikow
Assistant Examiner—Lesley D. Morris
Attorney, Agent, or Firm—Helfgott & Karas

[57] ABSTRACT

A relocatable irrigator for easily converting between irrigation and transport modes of operation. The irrigator includes a number of carriages separated by pipeline spans. The pipeline spans are bridged between adjacent carriages and define a spray line. There is a master carriage and a number of slave carriages coupled together. Each slave carriage includes a steerable wheel assembly and a steering mechanism wherein the slave carriages may be steered remotely from the master carriage between irrigation and transport positions.

9 Claims, 8 Drawing Sheets

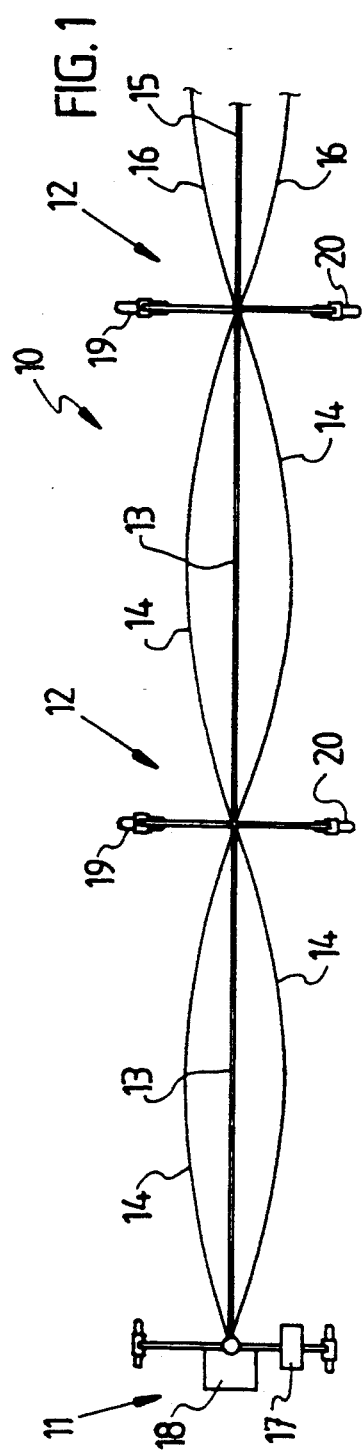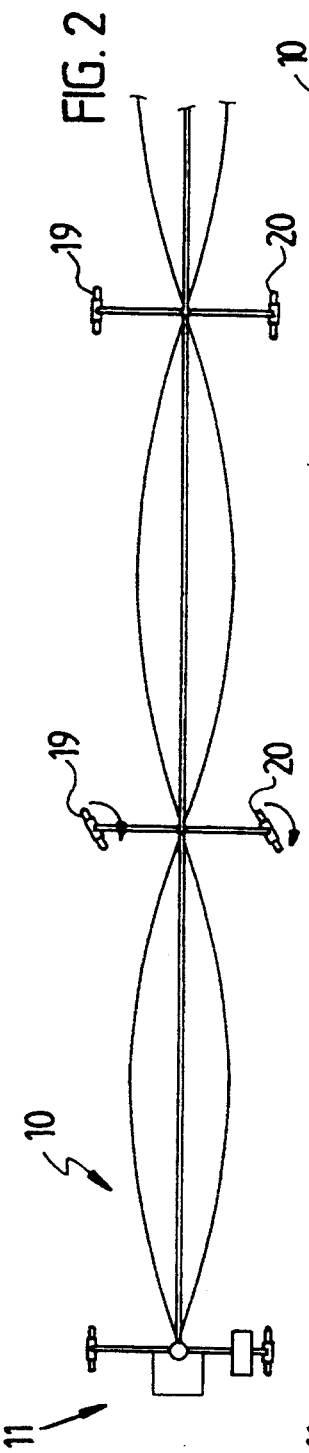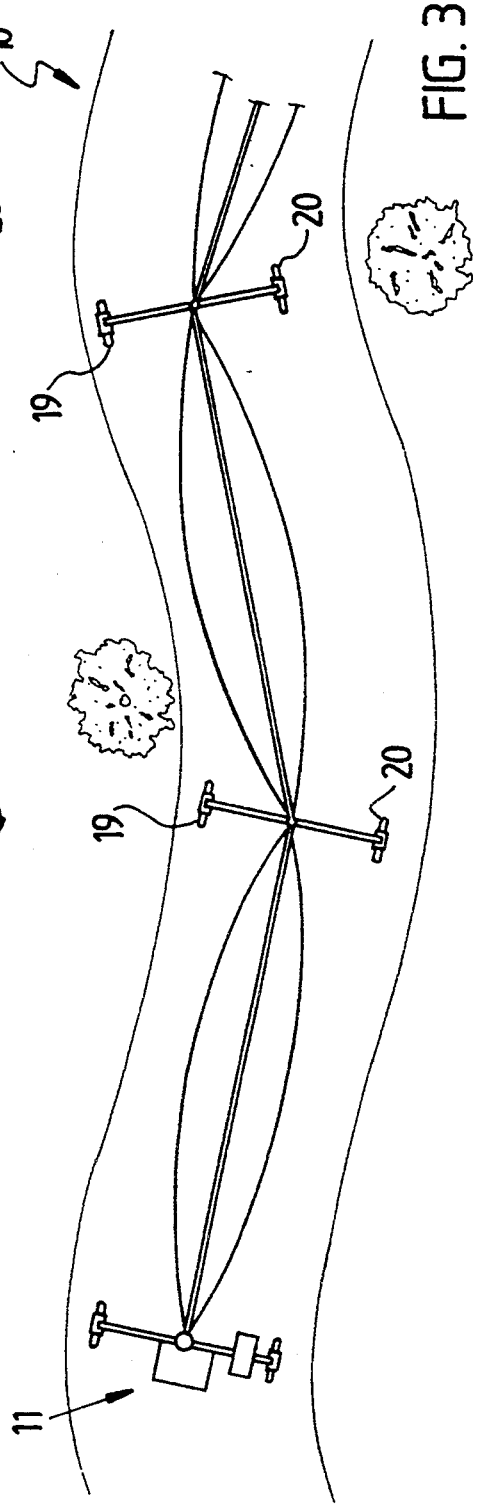

RELOCATABLE IRRIGATOR

TECHNICAL FIELD

This invention relates to irrigators and in particular but not limited to irrigators of the center pivot or linear or lateral type.

BACKGROUND ART

Center pivot irrigators have been used in Australia since the 1960's. A typical center pivot irrigator consists of a pipeline comprising a series of pipeline spans having spray nozzles at spaced locations along each span, the spans being supported by various types of trusses wherein each span is located at an elevated position between wheeled carriages. The whole pipeline rotates about a pivot point and the supporting carriages travel around concentric circles in order to irrigate a circular area. Water is usually introduced into the pipeline at the center of the circular area. A linear or lateral type irrigator has the same basic structure as the center pivot irrigator except it does not travel in a circle but the carriages travel in a line to irrigate a rectangular area.

The existing center pivot and lateral irrigators have a number of disadvantages. For example, the wheel assembly of each carriage usually comprises two spaced wheels which can be manually moved between irrigation and transport positions. When in the irrigation position, the wheels are aligned with the circumferential or linear track that they are to travel and when in the transport position, they are moved through approximately 90°. Thus, a towing vehicle can be coupled to the end of the irrigator and it can be towed from one location to another. In the present systems, it is a time consuming procedure to move the wheels, usually involving jacking the carriages or individual wheels and manually shifting them into position prior to transport and following the reverse procedure once the irrigator has been moved to the new location. Also the known irrigators do not tolerate large departures from straight line motion when being moved.

Generally, irrigators of the center pivot type only irrigate circular areas, however, one known design employs a corner watering device employing a trailing outer pipeline span which lags behind the main pipeline and is electronically controlled via an underground electric cable so that as the irrigator passes a corner, the lagging span travels out progressively into a radial position and then travels back into its lagging position as the irrigator passes the corner. This form of corner watering device is only partially successful. Another way of dealing with this problem is that in some irrigators, a large radially directed sprinkler is employed which is turned on as the irrigator passes a corner. This results in irrigation water being delivered outside the target area and/or the distribution of water in the corner being non-uniform. The first mentioned corner watering system involving the lagging span provides a more uniform coverage but is expensive and unreliable and consequently, is very uncommon.

A further problem inherent in conventional irrigators employing carriages is that the ground directly in front of the carriage wheels is watered and as the carriage wheels travel through this watered region "rutting", involving creation of circular grooves in the terrain, can occur which in turn can create later problems when moving the irrigator or during subsequent harvesting procedures.

DISCLOSURE OF THE INVENTION

It is therefore an object of the present invention to alleviate at least to some degree one or more of the aforementioned problems associated with the prior art.

In one aspect therefore, there is provided a relocatable irrigator configurable between irrigation and transport modes of operation, the irrigator comprising a plurality of carriages and respective pipeline spans bridging between adjacent carriages defining a spray line, at least one said carriage including a remote controlled wheel assembly movable between irrigation and transport positions under remote control.

Preferably, the carriages comprise a master carriage and a plurality of slave carriages wherein there is provided an articulated coupling by which adjacent slave carriages are coupled together, each slave carriage including a steerable wheel assembly and a steering mechanism operable from the master carriage in order to actively and remotely steer the wheel assemblies.

Preferably, in the case of a center pivot irrigator, the spray line includes an outer end and a corner sprayer at or adjacent to the outer end of the spray line, the corner sprayer comprising a directional spray assembly for delivering irrigation water into a corner in selected directions depending on the angular position of the irrigator, the arrangement being that irrigation water is delivered by the spray assembly in a forward direction as the outer end of the spray line approaches the corner and in a reverse direction as the outer end of the spray line recedes from the corner.

Preferably, there is provided in association with a said carriage, a wheel track sprayer adapted to deliver irrigation water onto wheel tracks behind the carriage as the irrigator operates.

In the case of a center pivot irrigator, it is preferable that the irrigator travels around a stationary temporary reference member, the reference member being temporarily located in a hole in the ground and including ground engageable anti-rotation means which enable the reference member to be fixed relative to motion of the carriages for reference purposes.

When in the transport mode, the relocatable irrigator is preferably capable of travelling around corners and up and down hills without damage to the irrigator. Accordingly, it is preferred that the articulated coupling means be arranged to allow large vertical and horizontal deviations of adjacent pipeline spans relative to one another. Preferably, the articulated coupling means comprises a ball and socket type joint connecting respective rigid members together. Advantageously, the pipeline spans are in liquid communication via a loop of flexible piping material connected in parallel with the articulated coupling means.

Under normal operation, the pipeline spans are arranged in alignment and it is therefore preferable that a positioning mechanism be employed which comes into play when the irrigator is in the irrigation mode in order to maintain the carriages in predetermined positions during operation so that alignment is maintained. In one embodiment, the positioning mechanism employs an alignment linkage bridging between adjacent spans, the linkage being coupled to the spans in parallel with the articulated coupling means and comprising first and second pivotal links, the links being pivotal about horizontal axes so that the positioning mechanism can tolerate vertical deviation between the adjacent spans as the irrigator travels over undulating terrain. The linkage is preferably coupled to one of the spans via a position detector, the position detector including a rotation monitor which detects horizontal misalignment between the spans. The vertical movement being preferably provided by a horizontal pivot axis hinge type joint between the links, the joint typically being located adjacent the articulated coupling means. The horizontal movement is typically provided by a vertical axis rotation type coupling which, as mentioned above, can conveniently also serve as a position detector for the positioning mechanism when the irrigator is in the irrigation mode. Advantageously, the horizontal pivot axes coincides with the center of pivot of the articulated coupling means. Thus, not only can the irrigator tolerate tight corners and steep hills during transport but it can also operate on undulating land when in the irrigation mode.

The master carriage preferably includes a suitable engine or motor along with a steering control adjacent an operator position for independently steering individual carriages. Where a train of slave carriages and pipeline spans trail behind the master carriage, each slave carriage is preferably independently steered and powered from the operator position. Advantageously, the wheel assembly of each carriage includes a hydraulic motor driven from the master carriage. The speed of travel when in the transport mode is low, of the order of 3 km per hour so that the operator can steer distant carriages around spaced obstacles, etc. . . . As a further option, the irrigator can be operated from a hand-held control, for example, under radio control.

Each carriage preferably includes a tower on which the ends of adjacent pipeline spans are suspended, suitable trusses are employed to support each span. Each tower is preferably triangular in shape with cross member braces located sufficiently high to reduce crop damage as the carriages move. The wheel spacing is preferably equal to multiples of normal crop row spacing so that the wheels can travel between rows when in the transport mode.

The steering mechanism is preferably hydraulic being hydraulically controlled from the master carriage and includes a steering cylinder assembly and a steering linkage coupled to the steering cylinder and the wheels of the carriage so that the wheels are steered in concert.

The directional spray assembly can include steerable or fixed intermittently operated spray guns. Preferably, a plurality of spray guns are employed which are selectively operated by a spray controller. The spray controller preferably comprises cam actuated valves. Advantageously, the spray delivered to a corner is progressively guided from a forward direction generally tangential to the direction of travel of the outer most carriage through an outward radial direction to a reverse direction generally tangential to the direction of travel of the outermost carriage. The process then repeats itself for the next corner and so forth.

The wheel track sprayer is preferably operable automatically for the final rotation of a multi-rotation irrigation sequence. Thus, wheel rutting can be avoided. By providing two or more passes of the irrigator, a reduced water delivery per radian travelled can be made and the wheel track sprayer can include a valve so that the wheel track sprayer delivers a proportionally increased amount of water through the wheel track sprayer compared to the main pipeline so that the overall watering is fairly uniform.

The reference member preferably comprises an axial reference rod or cylinder about or on which various cams, cam followers or levers operate in reference to its fixed position. The reference member is preferably part of a vertically moveable upright coupled to a central pivot carriage which would normally be the master carriage if the irrigator is of the self-relocatable type. A lift cylinder assembly is preferably employed to move the upright in and out of the hole through suitable mountings on the central pivot carriage tower. The upright is preferably journalled in a rotating water inlet and water travels up a conduit in the upright to the pipeline. Alternatively, water to the pipeline spans can be delivered via a flexible length of hose wound about the upright such that the hose Unwinds or winds about the upright as the irrigator rotates. The hose can be mounted on a spiral or a helical guide so that the irrigator operates for a preset number of rotations equal to the number of turns in the wound hose.

The anti-rotation means can comprise a hole engageable blade which in the case of a fixed outer cylinder would engage the side wall of the hole or in the case of a fixed axial rod, the anti-rotation means can be embedded in the bottom of the hole or engaged with a fixed member within the hole.

BRIEF DESCRIPTION OF THE DRAWINGS

In order that the present invention can be more readily understood and be put into practical effect, reference will now be made to the accompanying drawings illustrating application of the present invention to a center-pivot irrigator but it will be appreciated that teachings of the present invention apply to any irrigator where carriages are involved.

FIGS. 1, 2 and 3 illustrate a typical self-relocatable center-pivot irrigator according to the present invention;

METHOD OF PERFORMING THE INVENTION

Figure 4:
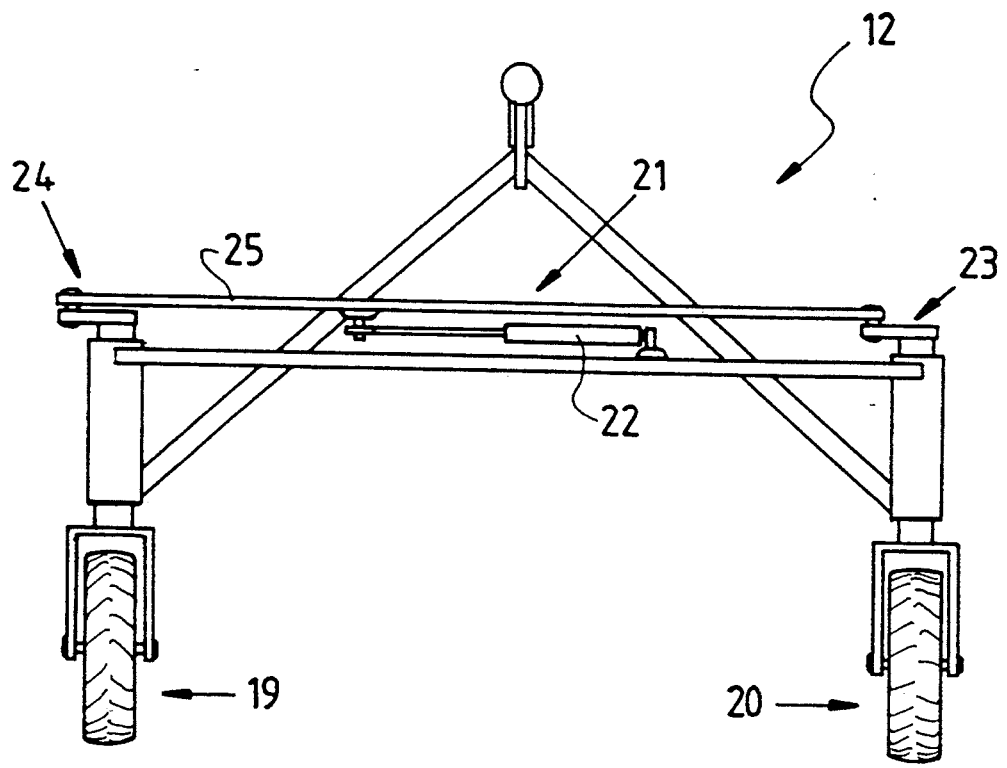
FIGS. 4 and 5 are respective elevation and plan views illustrating a typical slave carriage according to the present invention;.

Turning now to the drawings and initially to FIGS. 1 to 6C, there is illustrated a self-relocatable center-pivot irrigator 10 comprising a master carriage 11 and in this case, two slave carriages 12 with respective pipeline spans 13 between the carriages. The pipeline spans 13 are supported by "bow string" trusses 14 bridging between the carriages 12. The possibility of there being additional carriages in the irrigator is illustrated by the cut-away portion of spans 15 and bow string trusses 16 as shown. The master carriage 11 is self propelled as are the slave carriages 12 and for this purpose, the master carriage includes a hydraulic power pack 17 and a driver/operator position 18 where the necessary controls for driving and steering the irrigator carriages are positioned. The slave carriages are coupled together by articulated coupling means (see FIGS. 6A, 6B and 6C) so that when the irrigator is configured in a transport mode as illustrated in FIG. 3, the carriages can move up and down hills and around corners as depicted without damage to the irrigator. Each carriage 11 and 12 includes a wheel assembly comprising two steerable wheels 19 and 20 which can be positioned in an irrigation mode (as in FIG. 1) or in a transport mode (as in FIG. 3). The wheels can be steered using a suitable steering mechanism between the positions illustrated in FIGS. 1 and 3 by the operator at the operating position 18.

Figure 5:
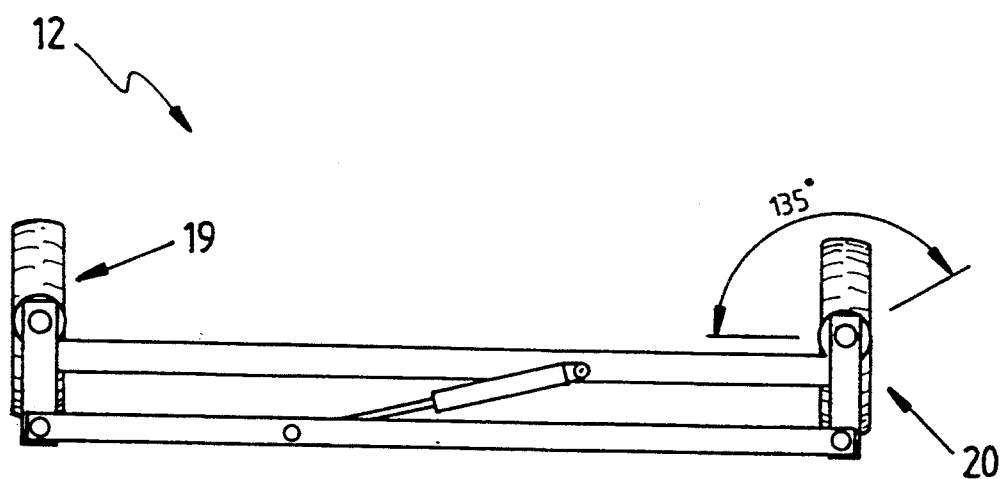

Referring to FIGS. 4 and 5, there is illustrated a typical slave carriage 12 employing a hydraulically driven steering mechanism 21, the steering mechanism employs a steering cylinder 22 and respective steering linkages 23 and 24 located at opposite ends of a connecting rod 25 so that the wheels 19 and 20 can rotate in unison through an arc of around 135° as depicted in FIG. 5. The wheels 19 and 20 are also hydraulically driven by suitable axial hydraulic motors (not shown) with the power take off coming from the master carriage.

Figure 6A:
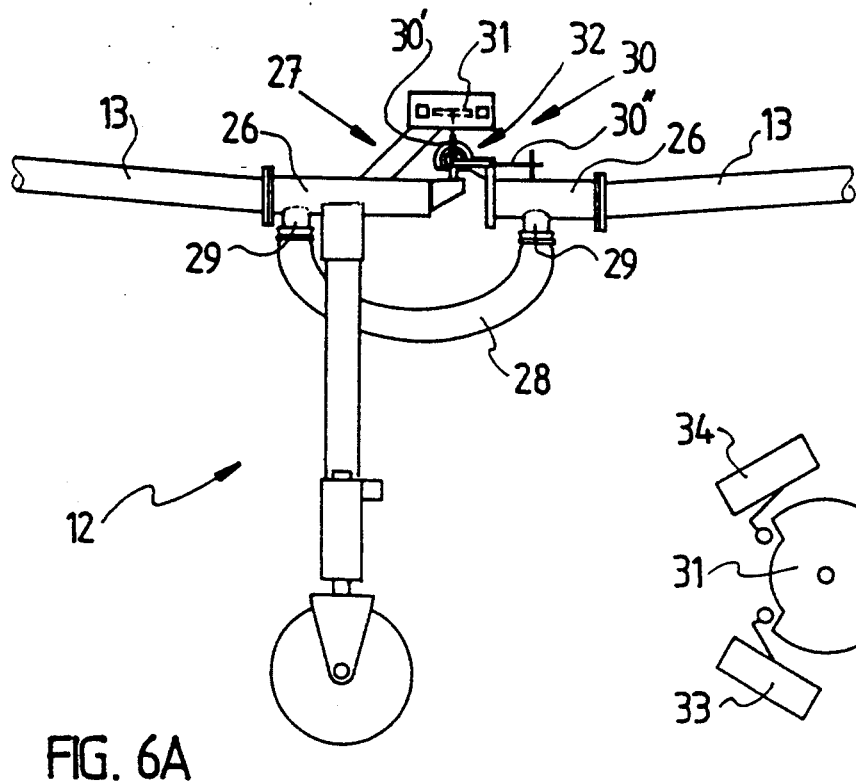
FIGS. 6A, 6B and 6C illustrate a typical arrangement whereby slave carriages are coupled together.

Referring to FIG. 6A, there is illustrated a typical slave carriage 12 where the pipeline spans 13 have their respective adjacent end portions 26 coupled together using a ball and socket hitch 27 which allows at least 90° horizontal pivotal movement of the pipeline spans 13 relative to each other. A flexible loop of hose 28 interconnects respective spigots 29 so that the pipeline spans 13 are in liquid communication and the loop also enables liberal movement.

Figure 6C:
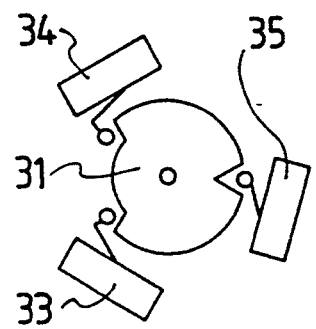
Figure 6B:
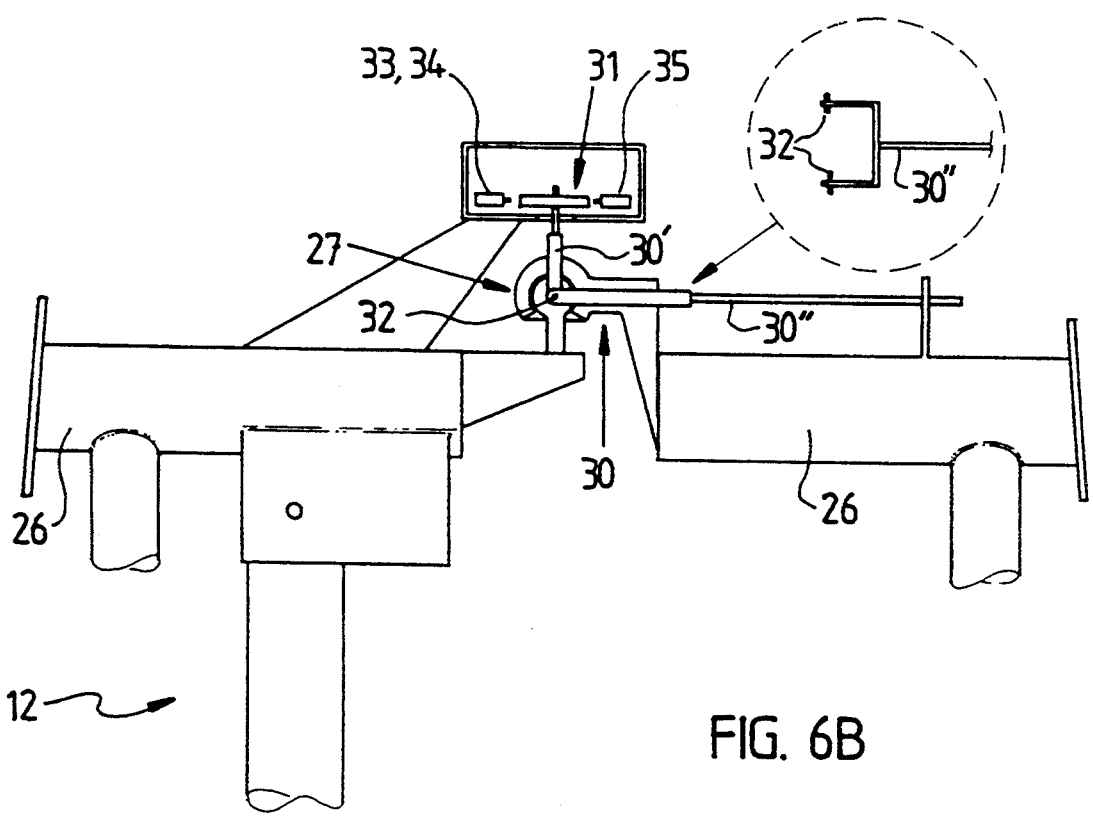

During operation of the irrigator in the irrigation mode, the wheels are driven intermittently and it is necessary to detect misalignment between the pipeline spans 13 and to correct this misalignment by driving the wheels of those carriages which are out of alignment as required until such time as mutual radial alignment is achieved. Thus, the irrigator is continually moving between misaligned to aligned situations in normal operation. To this end, there is provided in conjunction with each pipeline span 13 an alignment linkage 30 which is coupled to a cam 31 to detect misalignment in a horizontal plane. The linkage 30 comprises two links 30' and 30''. In order to take into account vertical movement of the linkage 30, a horizontal hinge 32 is employed between the links 30' and 30'' of the alignment linkage 30. The horizontal hinge has its axis coincident with the center of the ball and socket hitch 27. Thus, as can be seen in FIG. 6C, a number of limit switches 33, 34 and 35 are employed around the cam 31 in order to be switched if and when the cam rotates in either direction in response to misalignment of the pipeline spans 13. Of course, the cam 31 and switches 33, 34 and 35 will only be operable when the irrigator is in the irrigation mode. Of course, should a large deviation occur during the irrigation mode in response to a mechanical breakdown or otherwise switches 33 or 34 and 35 will eventually be switched together and in this case, in order to prevent extensive damage to the irrigator when the combination of switches 33 or 34 and 35 are switched, operation of the irrigator can be terminated.

Figure 7:
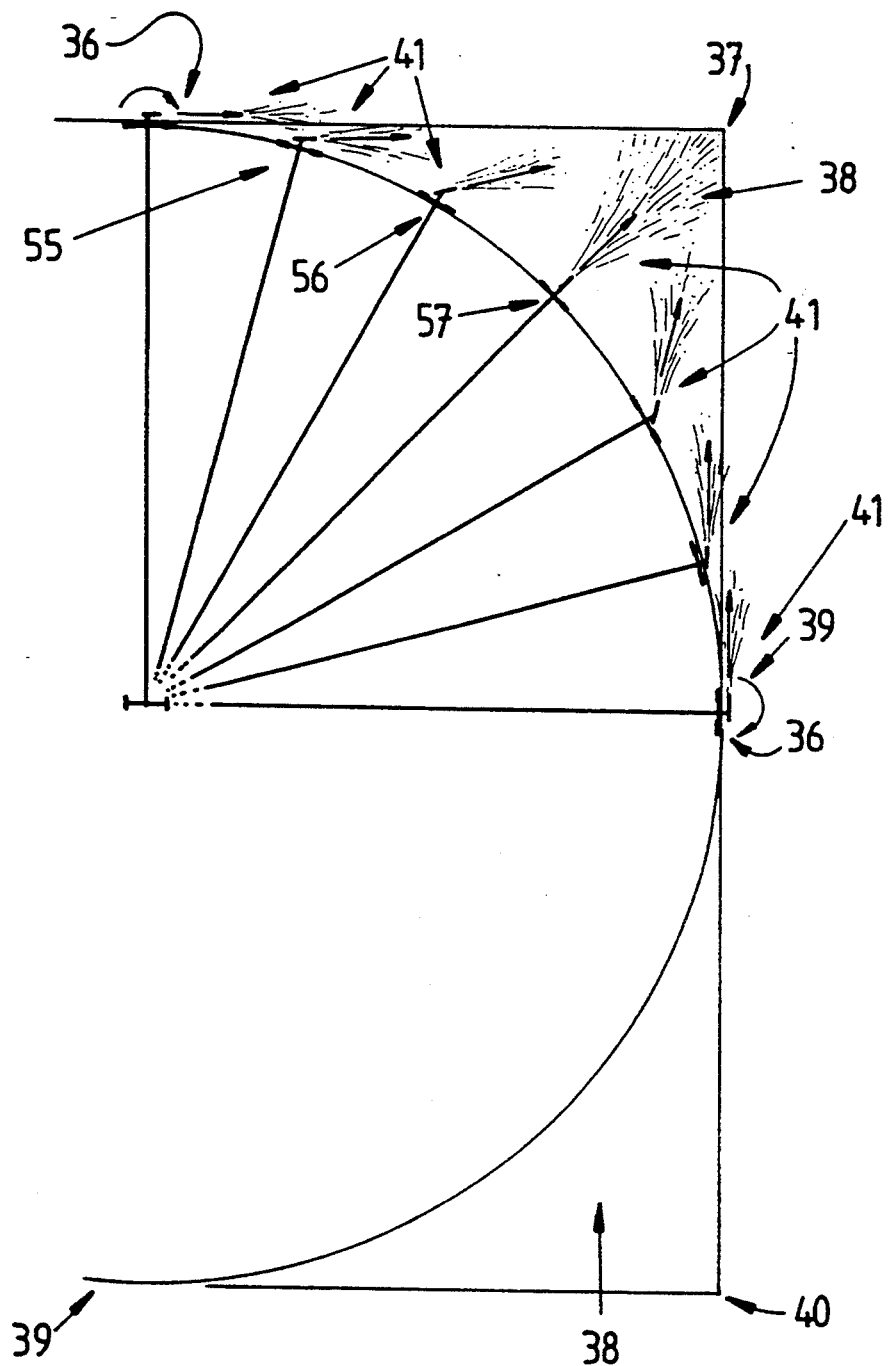
FIGS. 7, 8A and 8B illustrate the operation of a preferred corner sprayer according to the present invention.

Referring to FIG. 7, there is illustrated a typical corner sprayer suitable for an irrigator according to the present invention. As can be seen, the operation of the corner sprayer involves an initial tangential spray at point 36 with the direction of spray in a forward direction. As the irrigator travels toward the corner 37, the direction spray is steered from the tangential position at point 36 to a radial position at point 38, in turn then after point 38, the spray direction is reversed and progressively returns to a reverse tangential position at point 39. On reaching point 39, the sprayer reverts to a forward tangential direction and the process is then repeated for corner 40 and so forth.

Figure 8B:
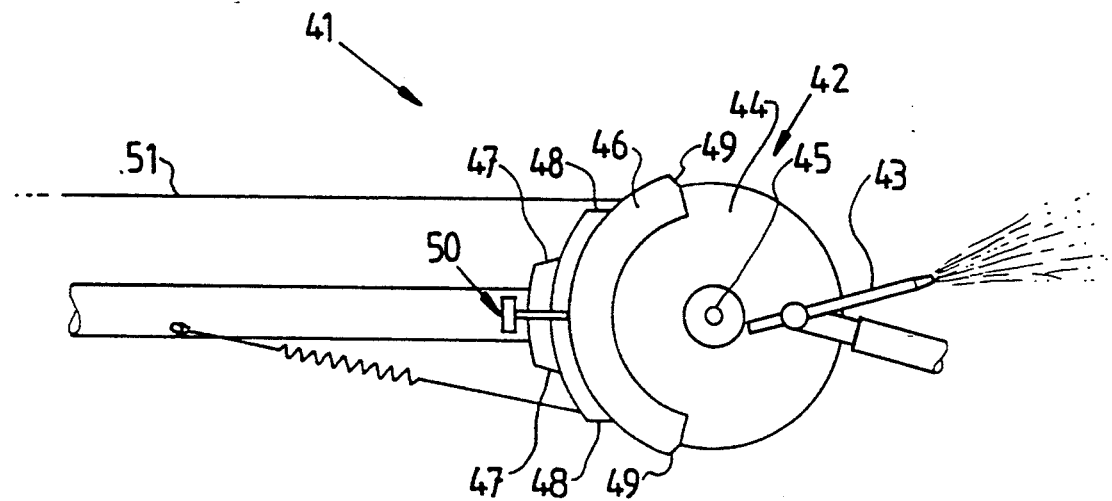
Figure 8A:
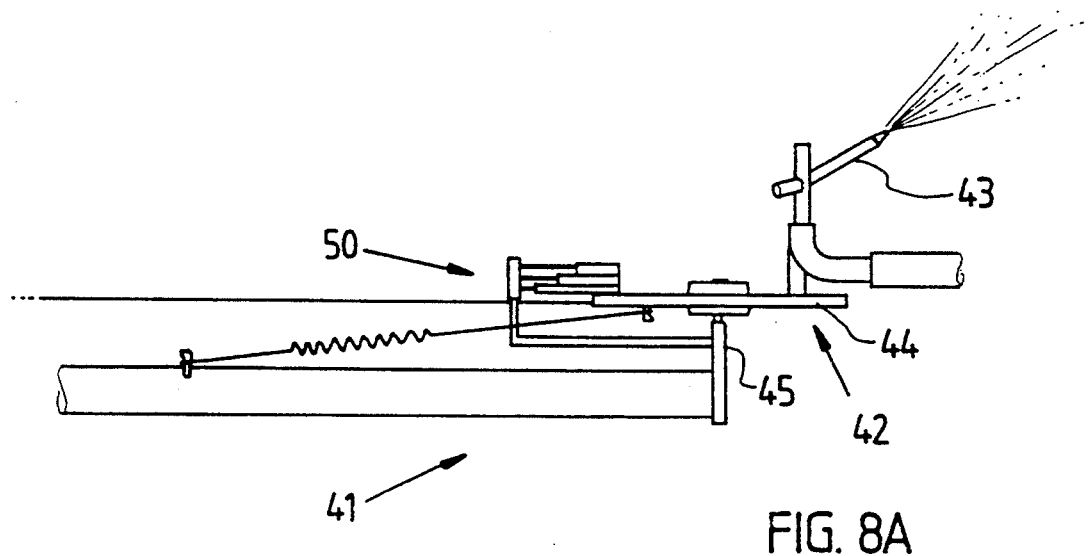
Figure 10:
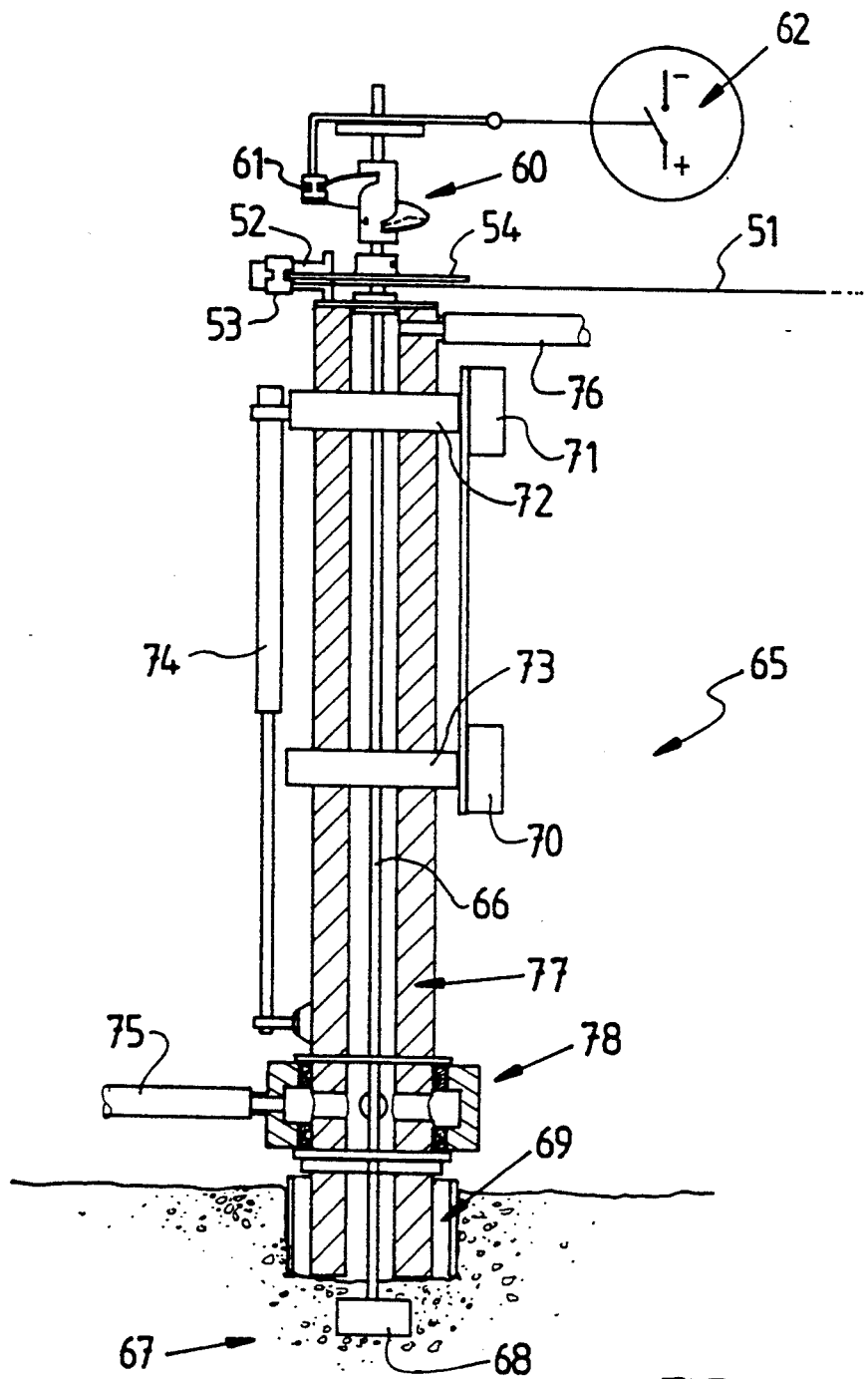
FIG. 10 is a schematic view illustrating a suitable temporary reference member which can be used in a center-pivot irrigator according to the present invention.

A typical end sprayer arrangement is depicted in FIGS. 8A and 8B which are respective elevation and plan views of a corner sprayer 41 which employs a directional spray assembly 42, the operation of which will be better understood by reference to FIG. 10 in addition to FIGS. 8A and 8B. As can be seen, a spray nozzle 43 is mounted on a turntable 44 which itself is mounted upon a pivot post 45 for rotation thereabout. Additional spray nozzles can be employed. The turntable carries a cam plate 46 which has camming surfaces 47, 48 and 49, the camming surfaces being adapted to make contact with a bank of valve control switches 50 as the turntable rotates. Each valve delivers water to a particular spray nozzle depending on which switch in bank 50 is activated. A control cable 51 is attached to the turntable and travels the full length of the center-pivot irrigator to the central pivot tower where the cable 51 is attached at its other end to a lever 52. The lever 52 has its other end coupled to a cam follower 53 which follows a cam plate 54 designed to cause the cable 51 to act upon the turntable 44 in order for the turntable to travel through, in this case, approximately 180° of arc.

There is generally employed more than one sprinkler 43, these are controlled by a series of switches in the switch bank 50 such that a different nozzle delivering irrigation water at a different volume comes into play at different stages of irrigator travel. Thus, in FIG. 7, a lower intensity sprayer will come into play at point 55 and at points 56 and 57, a different intensity sprayer will come into play and so forth. The switch bank 50 and camming surfaces 47, 48 and 49 can also be located elsewhere on the machine.

Figure 9A:
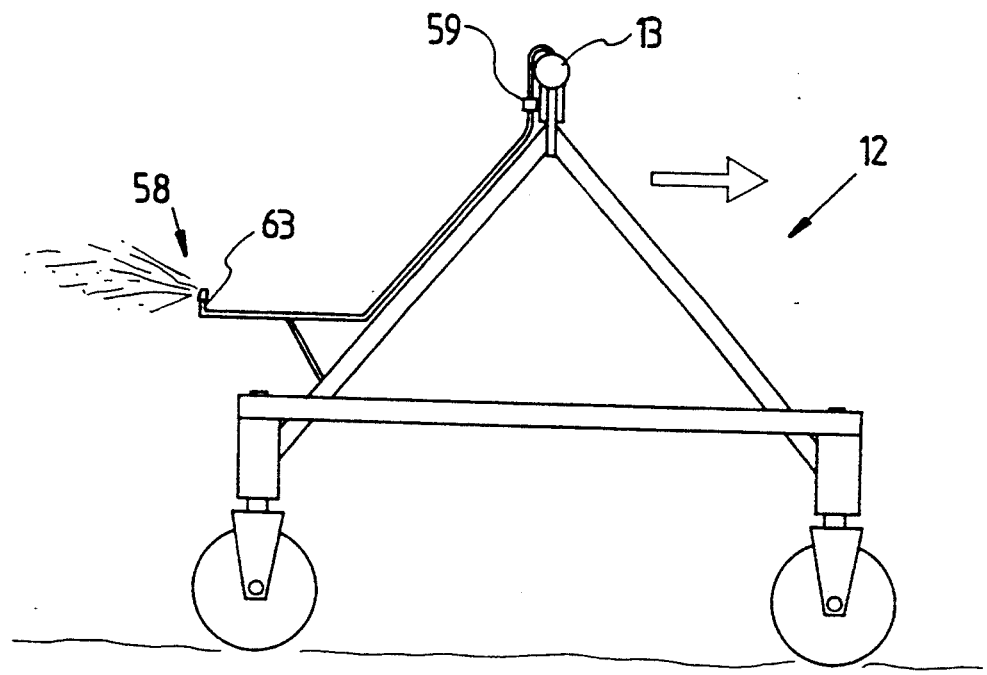
FIGS. 9A and 9B are schematic illustrations illustrating operation of a typical wheel track sprayer according to the present invention.
Figure 9B:
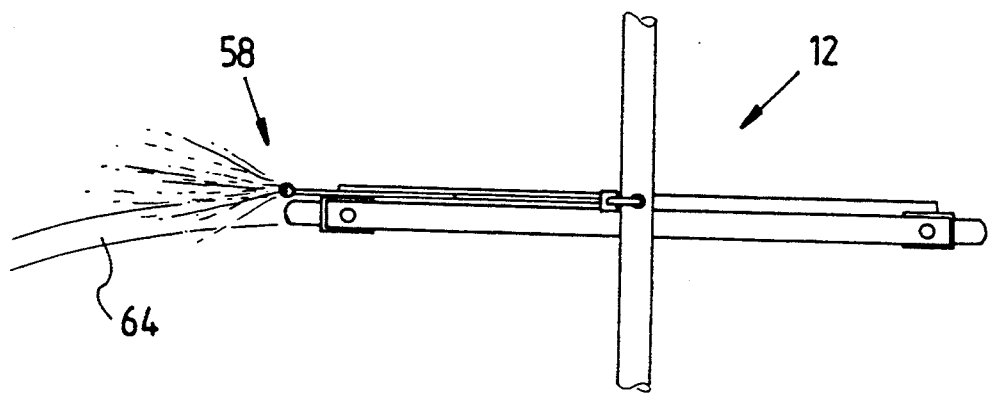

Referring to FIGS. 9A and 9B, there is illustrated a slave carriage 12 employing a wheel track sprayer 58 wherein FIG. 9A is a radial view and FIG. 9B is a plan view of the carriage 12. In the illustrated embodiment, the sprayer 58 is controlled by a valve 59 which is opened in response to initiation of the final cycle of rotation of the irrigator about the central pivot tower. Other cycles of operation of the valve 59 can be used depending upon requirements. As can be seen in FIG. 10, the central pivot tower includes a fixed spiral 60 and a spiral follower 61 which activates a switch 62 at a predetermined time in the travel of the center-pivot irrigator. The switch 62 activates the valve 59 so that water is delivered through the wheel track sprayer nozzle 63 during the duration of the final cycle of rotation of the center pivot irrigator. Thus, by using a suitable spray nozzle formation from the pipeline spans 13, the delivery of water to the wheel tracks 64 can be limited to the final pass of the irrigator and thereby rutting can be avoided. The spiral 60 can include steps (see broken line) so that additional switches for say, final shut down of the machine or initiation of other actions can be invoked during one or more cycles.

Referring now to FIG. 10 there is illustrated a central upright arrangement 65 including a stationary temporary reference member in the form of a fixed axial rod 66 which has at its lower end 67 an anti-rotation means in the form of a spade 68 embedded in the bottom of a hole 69. The upright 65 is coupled to the central pivot tower at convenient attachment points and in this case, at the tower's respective upper and lower cross members 71 and 70. The upright 65 is arranged to travel in a vertical direction through collars 72 and 73 by action of a hydraulic cylinder assembly or winch or other suitable means 74. The upright includes a water inlet at 75 and a water outlet at 76 which communicates with the first pipeline span 13. The other pipeline spans are connected in series with the first span. The upright includes an annular pipe 77 which rotates in bearings in unison with the travel of the slave carriages of the center pivot irrigator. The water inlet 75 communicates with a jacket 78 in which the pipe 77 is journalled for rotation. As the axial rod is fixed, the spiral 60 and cam plate 54 are also fixed such that the followers 53 and 61 travel with the irrigator and the axial rod 66 provides a central reference member against which angular reference can be taken for operation of the corner sprayer and the wheel track sprayer through the various stages of operation as described above.

Figure 11A:
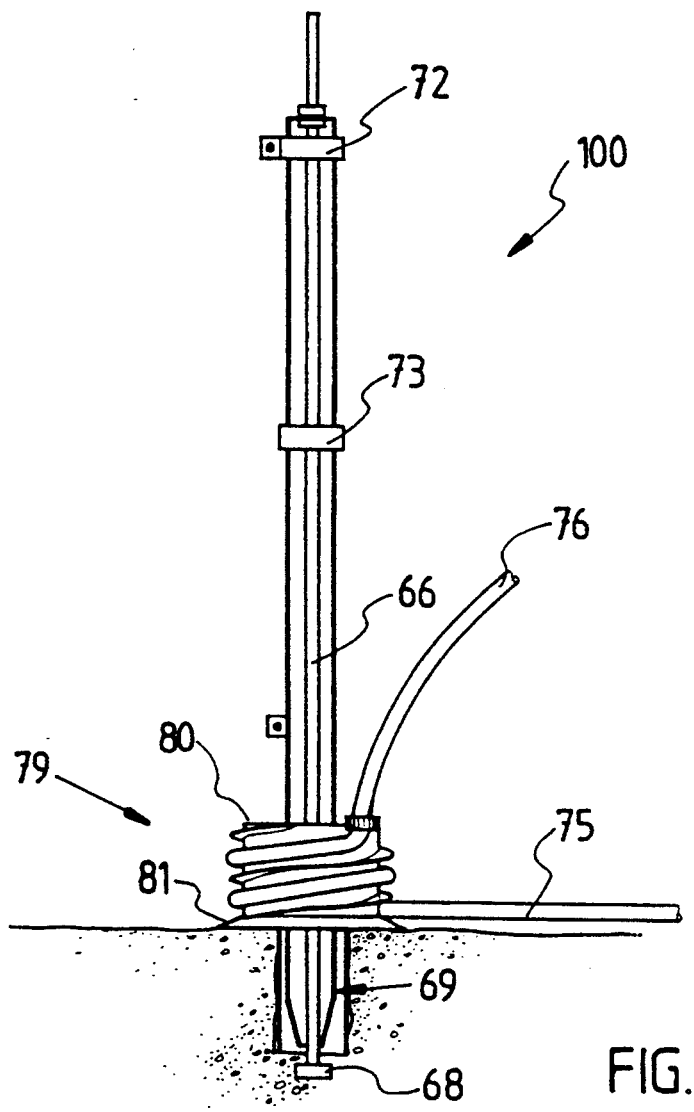
FIG. 11A is a schematic view similar to the view of FIG. 10 illustrating an alternative temporary reference member suitable for use in a center-pivot irrigator according to the present invention.

Referring to FIG. 11A, there is illustrated an alternative central upright arrangement 100 and where appropriate like numerals illustrate like features. It will be understood that the reference member performs a similar function to that of FIG. 10 and accordingly, the various cams, cylinder assemblies and spirals, etc., have been omitted for clarity. The embodiment of FIG. 10 employs a rotary water jacket 78 which enables continuous multi-rotation operation of the irrigator. In the FIG. 11 embodiment, the jacket 78 has been replaced by a hose spiral 79 mounted on a helical guide 80 which rotates with the irrigator so that the hose can be wound or unwound as the irrigator operates. The number of turns of the hose corresponds to a normal irrigator cycle which in the embodiment of FIG. 11A corresponds to two cycles. A skirt 81 is employed to assist stabilization of the arrangement.

Figure 11B:
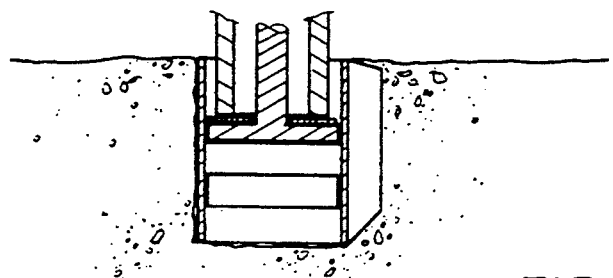
FIG. 11B is a sectional view illustrating the lower portion of an alternative temporary reference member.

FIG. 11B illustrates a still further embodiment where a fixed hole liner 82 having circumferentially spaced radial flanges 83 is employed so the flanges are embedded in the wall of the hole. Thus, a plurality of these liners can be arranged, at different sites and the irrigator can simply be moved from site to site.

It will be appreciated from the foregoing that the present invention provides a more effective irrigator than was known in the prior art. As will be appreciated, by adopting an irrigator having a flexible coupling arrangement between carriages and self driven steerable carriages that an irrigator according to the present invention can be easily relocated. Also by employing the temporary reference member, the irrigator can be located at any desired location for irrigation purposes. Likewise, by embodying a corner sprayer and a wheel track sprayer in a center pivot irrigator according to the broad aspects of the present invention, a more uniform delivery of irrigation water to a square area can be achieved without the adverse characteristics associated with the prior art.

It will therefore also be appreciated that whilst the above has been given by way of illustrative example of the present invention, many variations and modifications thereto will be apparent to those skilled in the art without departing from the broad ambit and scope of the invention as defined in the appended claims.

I claim:

1. A relocatable irrigator configurable between irrigation and transport modes of operation, the irrigator comprising a master carriage and a plurality of slave carriages including articulated coupling means by which adjacent slave carriages are coupled together and respective pipeline spans bridging between adjacent carriages defining a spray line, each slave carriage including a steerable wheel assembly and a steering mechanism operable from the master carriage in order to actively and remotely steer the wheel assemblies between irrigation and transport positions under remote control, wherein the spray delivered to a corner is progressively guided from a forward direction generally tangential to the direction of travel of an outermost carriage through an outward radial direction to a reverse direction generally tangential to the direction of travel of the outermost carriage.

2. An irrigator according to claim 1 wherein the master carriage is self-driven.

3. An irrigator according to claim 1 wherein the irrigator is a center pivot irrigator and the spray line includes an outer end and a corner sprayer at or adjacent to the outer end of the spray line, the corner sprayer comprising a directional spray assembly for delivering irrigation water into a corner in selected directions depending on the angular position of the irrigator, the arrangement being that irrigation water is delivered by the spray assembly in a forward direction as the outer end of the spray line approaches the corner and in a reverse direction as the outer end of the spray line recedes from the corner.

4. An irrigator according to claim 1 wherein there is provided in association with each said carriage, a wheel track sprayer adapted to deliver irrigation water onto wheel tracks behind each carriage as the irrigator operates.

5. An irrigator according to claim 1 wherein the irrigator is a center-pivot irrigator and includes a stationary temporary reference number, the reference number being temporarily located in a hole in the ground and including ground engageable anti-rotation means which enable the reference member to be fixed relative to motion of the carriages for reference purposes.

6. An irrigator according to claim 1 wherein the articulated coupling means comprises a ball and socket type joint connecting respective rigid members together and the pipeline spans are in liquid communication via a loop of flexible piping material connected in parallel with the articulated coupling means.

7. An irrigator according to claim 1 including a positioning mechanism employing an alignment linkage bridging between adjacent spans, the linkage being coupled to the spans in parallel with the articulated coupling means and comprising first and second pivotal links, the links being pivotal about horizontal axes, the horizontal pivot axes coinciding with the center of pivot of the articulated coupling means.

8. An irrigator according to claim 1 wherein each carriage comprises a tower, each tower being generally triangular in shape with cross member braces located sufficiently high to reduce crop damage as the carriages move.

9. A relocatable irrigator configurable between irrigation and transport modes of operation, the irrigator comprising a master carriage and a plurality of slave carriages including articulated coupling means by which adjacent slave carriages are coupled together and respective pipeline spans bridging between adjacent carriages defining a spray line, each slave carriage including a steerable wheel assembly and a steering mechanism operable from the master carriage in order to actively and remotely steer the wheel assemblies between irrigation and transport positions under remote control, wherein there is provided in association with each said carriage, a wheel track sprayer means for delivering irrigation water substantially only onto wheel tracks behind each carriage as the irrigator operates.

* * * * *